United States Patent [19]

Cook

[11] Patent Number: 4,914,827

[45] Date of Patent: Apr. 10, 1990

[54] PROTECTION TECHNIQUE FOR GAGE HEADS

[75] Inventor: Kenneth J. Cook, Troy, Mich.

[73] Assignee: GTE Valenite Corporation, Troy, Mich.

[21] Appl. No.: 291,058

[22] Filed: Dec. 28, 1988

[51] Int. Cl.$^4$ .................... G01B 5/20; G01B 7/28
[52] U.S. Cl. ........................... 33/552; 33/554; 33/555; 33/549
[58] Field of Search ............... 33/552, 550, 551, 553, 33/554, 555

[56] References Cited

U.S. PATENT DOCUMENTS

| | | | |
|---|---|---|---|
| 3,905,119 | 9/1975 | Meyding | 33/552 X |
| 4,377,911 | 3/1983 | Iida et al. | 33/551 X |
| 4,603,487 | 8/1986 | Matsunata | 33/555 X |
| 4,775,947 | 10/1988 | Marron | 33/550 X |
| 4,802,285 | 2/1989 | Ligacz et al. | 33/551 |

Primary Examiner—Daniel M. Yasich
Attorney, Agent, or Firm—Harness, Dickey & Pierce

[57] ABSTRACT

A plurality of adjustable feelers are mounted to a gage head in front of relatively delicate sensing fingers. The feelers will contact the part before the sensing fingers in the event of part abnormality or improper positioning of the part within the gaging apparatus. In such manner, further movement of the gage head relative to the part can be stopped before the sensing fingers crash into the part thereby preventing damage to them.

14 Claims, 3 Drawing Sheets

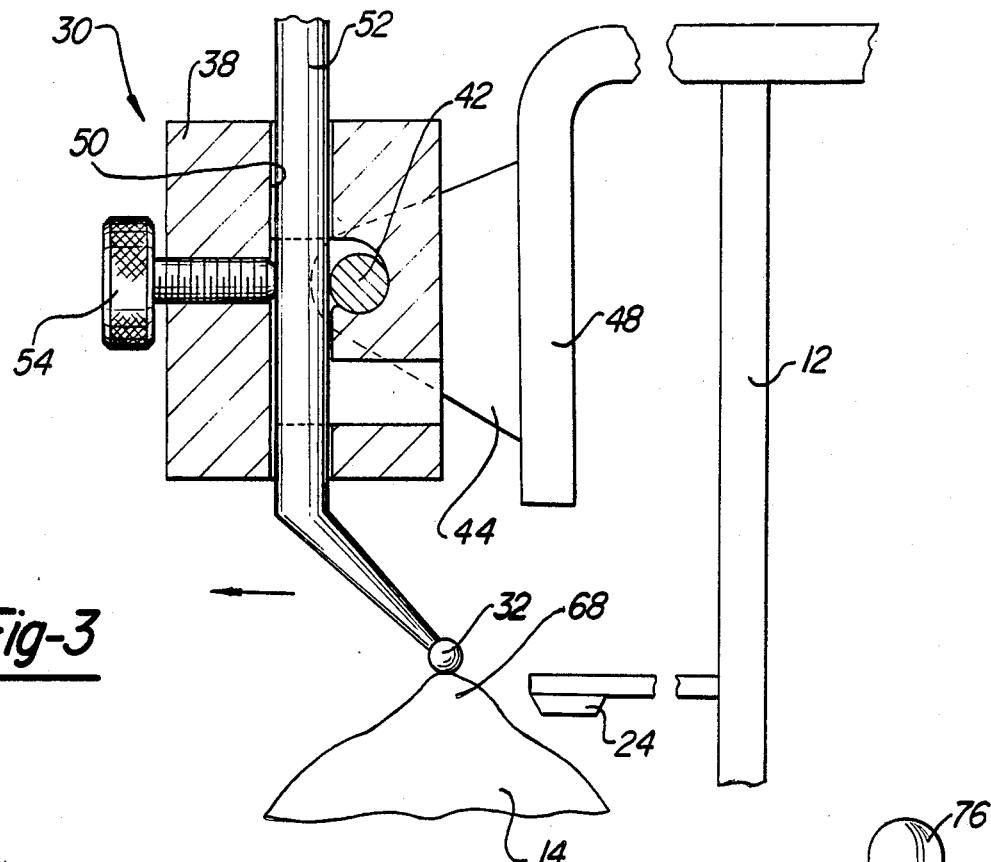
_Fig-3_
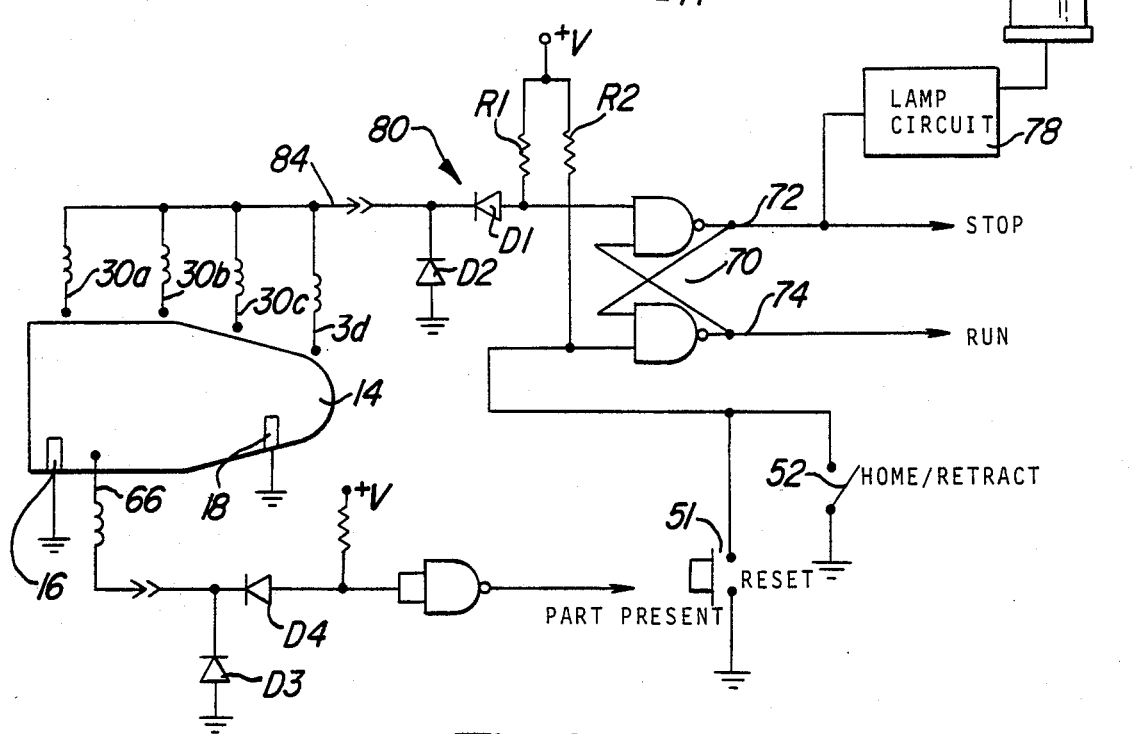
_Fig-4_

PROTECTION TECHNIQUE FOR GAGE HEADS

BACKGROUND OF THE INVENTION

1. Technical Field

This invention relates to methods and apparatus for gaging a workpiece. More particularly, it involves a technique for protecting gaging apparatus from damage.

2. Discussion

Gaging equipment is used to measure characteristics of a workpiece. The gaging equipment often takes the form of a moveable gage head that carries a plurality of sensing fingers that are used to contact the part at various locations. These sensing fingers are extremely sensitive and provide data relating to measurements of the workpiece. Unfortunately, these sensing fingers are relatively delicate and can be easily damaged. Damage can occur, for example, if the part is not properly located or if it is grossly out of size. In such instances the moveable gage head unwittingly crashes the fingers into the part causing damage to them.

There have been several gage protection schemes that have been tried in the past. One technique requires that the part pass through some type of template while others utilize sensing mechanisms on the support for the part. The use of the template approach is disadvantageous because it does not readily accommodate automatic loading of the part onto the support since the grippers of the automated machine, e.g., a robot, must also pass through this template. Since the grippers are often quite large, this approach is not always feasible. In addition, the templates of the prior art approach are typically not adjustable for different size parts. Similarly, the locking mechanisms in the other known approach are specifically designed for a given part size and must be replaced with new mechanisms for different part configurations.

SUMMARY OF THE INVENTION

In accordance with the teachings of the present invention, a plurality of feelers are provided in front of the delicate sensing devices. The feelers define an envelope in space through which the part must pass without touching the feelers. The envelope is of sufficiently large dimension that a properly positioned part will pass through it without touching the feelers as the gage head is moved to its sensing position. The envelope defined by the feelers is small enough so that part abnormalities or improper positioning of the part will result in at least one feeler touching the part before the sensing fingers come into contact with the part. Further, advancement of the gage head relative to the part is stopped in such instances before damage results to the sensing fingers.

In the preferred embodiment, the feelers are readily adjustable so that they can define different envelopes for different parts. In such manner, the gaging equipment can be used to gage a wide variety of parts, yet still be protected from damage.

BRIEF DESCRIPTION OF THE DRAWINGS

The various advantages of the present invention will become apparent to those skilled in the art by reading the following specification and by reference to the drawings in which:

FIG. 3 is a partial side view illustrating a presently preferred construction of the feelers; and FIG. 4 is an electrical schematic diagram of an example of suitable electrical circuitry for use with the present invention.

DESCRIPTION OF THE PREFERRED EMBODIMENT

Figure 1:
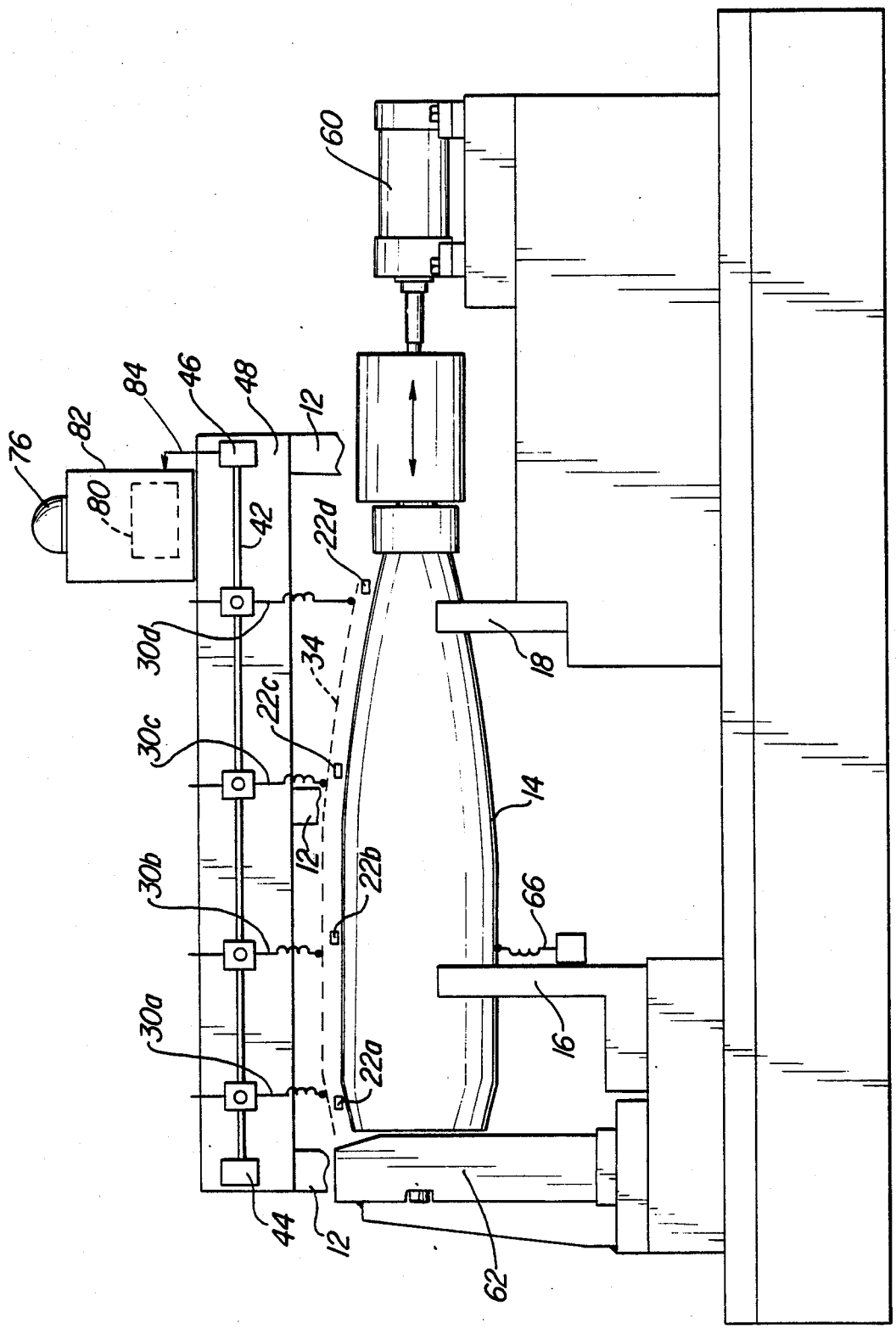
FIG. 1 is a front view of gaging equipment utilizing the protection scheme taught by the present invention.
Figure 2:
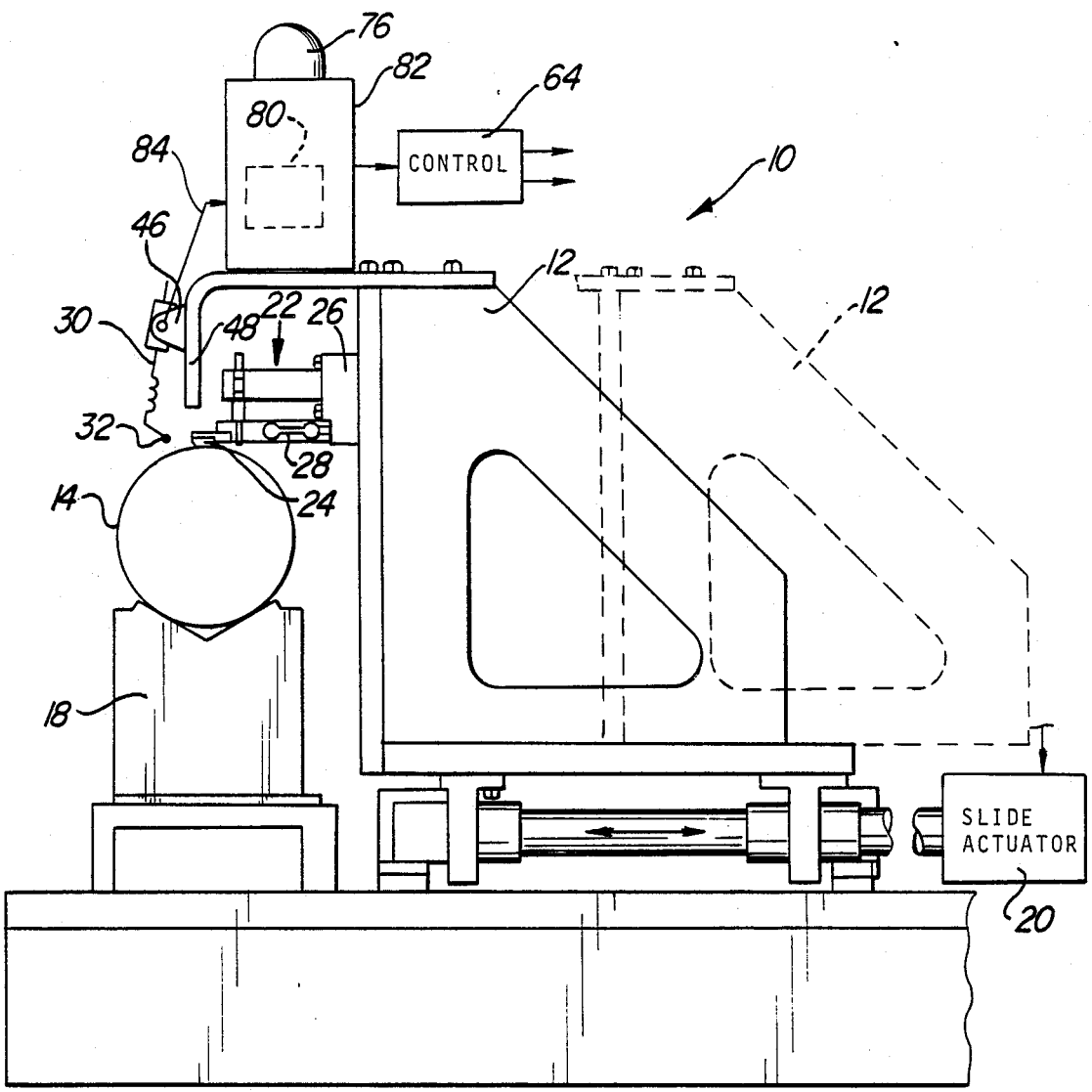
FIG. 2 is a side view of the gaging equipment of FIG. 1.

Turning now to FIGS. 1 and 2, gaging equipment 10 employs a moveable bracket or gage head 12 for measuring a workpiece 14. The workpiece 14 is supported on riser blocks or supports 16 and 18. Gage head 12 moves under the control of a slide actuator 20 as shown most clearly in FIG. 2. In the position shown in dotted lines in that Figure, the gage head 12 is spaced from the supports 16, 18 to enable the part 14 to be easily loaded. It is a feature of this invention that the part can be loaded by a variety of means including robots that hold the part with their conventional grippers.

After the part 14 is loaded onto supports 16 and 18, it is ready to be measured or gaged. The gage head 12 carries a plurality of sensing fingers 22(a–d). While only four such sensing fingers 22 are illustrated in the drawings, it should be understood that more fingers are typically used and that they often fully surround the part 14. Sensing fingers 22 serve to contact the part and provide a measurement thereof. In this embodiment, sensing fingers 22 include a tip 24 coupled to a linearly variable differential transducer (LVDT) 26 through a parallelogram arm 28. The tip 24 is displaced slightly when it contacts the surface of the part 14 and this displacement is converted by the LVDT 26 into suitable electrical signals which can be used to derive dimensional information about the part 14. Sensing fingers 22 are relatively delicate and expensive to make.

The present invention provides an elegantly simple, yet effective technique for protecting the sensing fingers 22. To this end, a plurality of feelers 30 are provided on the gage head 12. The feelers 30 are shown schematically in FIGS. 1 and 2 and in more structural detail in FIG. 3. The tips 32 of the feelers 30 define an imaginary envelope in space through which the part 14 must pass prior to engaging the tips 24 of the sensing fingers 22. In FIG. 1 the envelope is partially designated by the dotted line 34. Feelers 30 are preferably adjustable in all three dimensional planes so that the tips 32 thereof can be positioned to define different sized envelopes to accommodate a different placement of the sensing fingers 22 when a different size part is to be gaged.

FIG. 3 shows a specific construction for the feelers 30. Each feeler 30 includes a slide block 38 that has a horizontally extending opening 40 therein through which a support rail 42 passes. Support rail 42 is an electrically conductive rod mounted at its opposite ends to insulative holders 44, 46. Holders 44 and 46 (FIG. 2) are, in turn, mounted to a downturned flange 48 connected to gage head 12.

Slide block 38 further includes a vertically extending bore 50 through which wire 52 extends. Wire 52 is made of a suitable electrically conductive material that has sufficient rigidity to maintain the tip 32 at the desired position once set. Positioning of tip 32 can easily be accomplished by loosening adjustment set screw 54 and sliding block 38 along support rail 42 until the desired horizontal positioning of tip 32 is reached. Vertical positioning of tip 32 is made by sliding the shaft of wire 52 in bore 50. Then, adjustment set screw 54 is tightened to maintain the position of tip 32. The wires can also be bent somewhat to properly position the tips. Generally, the feeler tips 32 are positioned so that they are slightly forward and outside of an associated tip 24 of the sensing fingers 22.

According to the method of this invention, workpiece 14 is loaded onto supports 16 and 18, for example, by an automated robot. A cylinder 60 is actuated to press the workpiece 14 leftwardly against end block 62 as shown in FIG. 1. The energization of cylinder 60 is performed by a suitable controller represented by the box 64 in FIG. 2. Controller 64 then sends an appropriate "Run" signal to slide actuator 20 to cause the head 12 to begin moving toward the workpiece 14, i.e., leftwardly in FIG. 2. A suitable sensor 66, similar in construction to feelers 30, can be used to generate a "Part Present" signal to controller 64 when it senses that the workpiece 14 has been placed into the support 16, 18. Thus, the controller 64 knows when to initiate the gage head move cycle.

As the gage head 12 moves leftwardly, it carries the feelers 30 in front of the delicate sensing fingers 22. If the workpiece 14 is not positioned properly or if it has an abnormality 68 thereon as shown in FIG. 3, the tip 32 of one of the feelers 30 will contact the part 14 before any of the sensing fingers 24. When this occurs, current is conducted through that feeler 30 and through the metal workpiece 14 to ground via the grounded supports 16 and 18. As can be seen in FIG. 4, this produces a logical zero voltage level at the input to an RS flip/flop 70 comprised of two cross coupled logical NAND gates. Flip/flop 70 latches in a condition where line 72 is in a logical one state and line 74 is in a logical zero state. The signal on line 72 serves as a "Stop" command line which is coupled to the controller 64. Controller 64 deactivates the slide actuator 20 in response to the "Stop" signal. Thus, the gage head 12 is stopped before sensing fingers 24 contact the abnormality 68 which could otherwise damage the delicate nature of the sensing fingers 24. In addition, an optical alarm lamp 76 is lit by suitable lamp drive circuitry 78. The circuitry 80 of FIG. 4 can be conveniently mounted within housing 82. Circuitry 80 is connected to support rail 42 through a suitable conductor 84. A Reset switch S1 and Home/Retract switch S2 are provided in circuitry 80 for the purpose of resetting the flip/flop 70 and allowing the slide actuator 20 to return the gage head 12 to its home or retract its position, respectively.

In view of the foregoing, it should be appreciated that the present invention provides a cost effective method of protecting expensive and easily damaged sensors on sophisticated gaging equipment. The feelers 30 are easily adjusted to define different sized envelopes for different part configurations. The feelers are relatively unobtrusive and thus, it is possible to space them apart as necessary to accommodate various part delivery mechanisms, such as grippers of a robot. Various other advantages will become apparent to those skilled in the art after having the benefit of studying the specification, drawings and following claims. For example, the part can be moved towards a fixed gage head instead of vice versa as described in connection with the specific embodiment just described.

What is claimed is:

1. In a gaging system for measuring a part, the system having a gage head carrying a plurality of sensing devices thereon, a support for the part, and means for moving the gage head relative to the part so that the sensing devices come into contact with the part to provide measurements thereof, the improvement comprising:
   a plurality of feelers carried by the gage head in front of the sensing devices;
   means for stopping relative movement of the gage head with respect to the part if the feelers contact the part; and
   whereby the feelers define an envelope through which the part must pass without touching the feelers, the envelope being of sufficiently large dimension that a properly positioned normal part on the support will pass through the envelope without touching the feelers, the envelope being small enough that part abnormalities or improper positioning of the part on the support will result in at least one of the feelers touching the part prior to potentially damaging contact between the sensors and the part.

2. The system of claim 1 which further comprises:
   adjustment means for adjusting the position of the feelers.

3. The system of claim 1 which further comprises an electrically conductive support rail carried by the gage head; and
   wherein the feelers are mounted to the support rail.

4. The system of claim 3 wherein said feelers comprise:
   a slide block having horizontal and vertically extending openings therein;
   an electrically conductive wire having its shaft passing through the vertical opening; and
   an adjustment screw bearing on the wire to maintain a tip thereof in a predetermined position.

5. The system of claim 4 wherein the support rail passes through the horizontal openings in the slide blocks of the feelers.

6. The system of claim 1 wherein the feelers are electrically conductive and wherein the system further comprises:
   circuit means connected to the feelers for generating a stop signal when the feelers contact the part, the stop signal being used to stop further movement of the gage head relative to the part.

7. The system of claim 1 which further comprises:
   a visual alarm which is activated when the feelers contact the part.

8. Apparatus for gaging a workpiece, said apparatus comprising:
   support means for supporting the workpiece;
   a gage head carrying a plurality of sensing fingers projecting from one side thereof, a plurality of electrically conductive feelers moveable with the sensing fingers and positioned in front thereof;
   actuator means for moving the gage head towards the part after it has been positioned on the support means; and
   circuit means coupled between the feelers and the actuator means for stopping movement of the gage head towards the part if the feelers contact the part thereby preventing damage to the sensing fingers.

9. The apparatus of claim 8 which further comprises:
   an electrically conductive support rail mounted to the gage head; and
   adjustment means for adjusting the horizontal position of the feelers on the support rail.

10. The apparatus of claim 9 wherein said adjustment means further comprises means for vertically adjusting the feelers.

11. The apparatus of claim 8 wherein electrical current is conducted through a feeler upon contact with the part, and wherein the circuit means includes:
   latch means for generating a stop signal in response to current flow through a feeler.

12. The apparatus of claim 11 which further comprises:
   detector means for detecting the presence of the part in the support means and for generating a signal for initiating movement of the gage head toward the part.

13. A method of protecting delicate sensors on a gage head, said method comprising:
   a. placing a part on a support;
   b. positioning a plurality of feelers on the gage head in front of the sensors so that tips of the feelers define an envelope of a given configuration;
   c. moving the gage head relative to the part;
   d. contacting the part with the feelers if the part is not properly positioned on the support or if the part has abnormalities; and
   e. stopping movement of the gage head relative to the part in response to step d. before the sensors contact the part thereby protecting the sensors from damage.

14. The method of claim 13 wherein the feelers and part are electrically conductive, and wherein the method further comprises:
   creating current flow through the feelers upon contact with the part;
   detecting this current flow in an electrical circuit; and
   using the electrical circuit to generate a signal to stop further movement of the gage head.

* * * * *